US010585616B2

(12) United States Patent
Roberts

(10) Patent No.: US 10,585,616 B2
(45) Date of Patent: Mar. 10, 2020

(54) TIERED STORAGE SYSTEM WITH DATA ROUTING BY PEER STORAGE DEVICES

(71) Applicant: Western Digital Technologies, Inc., San Jose, CA (US)

(72) Inventor: Adam Roberts, Moncure, NC (US)

(73) Assignee: Western Digital Technologies, Inc., San Jose, CA (US)

( * ) Notice: Subject to any disclaimer, the term of this patent is extended or adjusted under 35 U.S.C. 154(b) by 1 day.

(21) Appl. No.: 16/055,021

(22) Filed: Aug. 3, 2018

(65) Prior Publication Data

US 2020/0042228 A1    Feb. 6, 2020

(51) Int. Cl.
G06F 12/00 (2006.01)
G06F 3/06 (2006.01)
H04L 29/08 (2006.01)

(52) U.S. Cl.
CPC .......... *G06F 3/0649* (2013.01); *G06F 3/0605* (2013.01); *G06F 3/0635* (2013.01); *G06F 3/0653* (2013.01); *G06F 3/0659* (2013.01); *G06F 3/0689* (2013.01); *H04L 67/104* (2013.01)

(58) Field of Classification Search
None
See application file for complete search history.

(56) References Cited

U.S. PATENT DOCUMENTS

| | | | |
|---|---|---|---|
| 8,055,622 B1 | 11/2011 | Botes et al. | |
| 8,838,931 B1 | 9/2014 | Marshak et al. | |
| 8,880,801 B1 | 11/2014 | Robins et al. | |
| 8,935,493 B1 | 1/2015 | Dolan et al. | |
| 8,972,694 B1 | 3/2015 | Dolan et al. | |
| 10,229,127 B1* | 3/2019 | Shang | G06F 16/128 |
| 2007/0233868 A1 | 10/2007 | Tyrrell et al. | |
| 2011/0072225 A1 | 3/2011 | Kawaguchi et al. | |
| 2012/0047346 A1 | 2/2012 | Kawaguchi | |
| 2013/0111129 A1* | 5/2013 | Maki | G06F 3/0611 711/117 |
| 2014/0149663 A1 | 5/2014 | Golander et al. | |
| 2015/0067295 A1 | 3/2015 | Storm et al. | |
| 2018/0165189 A1* | 6/2018 | Tai | G06F 3/0608 |
| 2019/0171365 A1* | 6/2019 | Power | G06F 3/065 |

* cited by examiner

*Primary Examiner* — John A Lane
(74) *Attorney, Agent, or Firm* — Patent Law Works LLP

(57) ABSTRACT

Example tiered storage systems, storage devices, and methods provide tier configuration for routing of data commands by peer storage devices. Each tiered storage device is configured to communicate with a plurality of peer storage devices with storage device identifiers. Each storage device is assigned to a performance tier in a tier configuration that determines which host data tier should be stored in the storage media of the storage device, the local performance tier for the storage device. If the local performance tier of the storage device does not match the host data tier for a data command or stored data element when the storage device determines the host data tier, the storage device selectively forwards the host data to another peer storage device with the performance tier that matches the host data tier. The storage device may periodically review the data it contains to evaluate whether stored data elements still match the criteria for the local performance tier and forward data elements that do not to a peer storage device with the appropriate performance tier.

20 Claims, 6 Drawing Sheets

TIERED STORAGE SYSTEM WITH DATA ROUTING BY PEER STORAGE DEVICES

TECHNICAL FIELD

The present disclosure generally relates to data storage systems, and in a more particular example, to tiered data storage systems.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ automated tiered storage. Automated tiered storage provides different types of interconnected storage devices, grouped into tiers of similar devices, and algorithms for automatically moving data from one tier to another. Types of storage may include differences in storage media, storage device specifications, device reliability, cost per capacity, input/output (I/O) performance class, and RAID configurations. For example, a storage area network (SAN) may be configured using automated tiered storage that migrates data blocks or objects between RAID 10, RAID 5, and RAID 0 tiers or a solid-state drive (SSD) tier, an enterprise-class hard disk drive (HDD) tier, and a desktop-class HDD tier.

In some tiered storage systems, particularly those based on SSDs, device endurance and fatigue from heavy I/O use and/or media wear/failure, may cause the tier classification of storage devices to change over time. Similarly, changes in use, age, risk, and other factors may cause the tier classification of data elements to change over time. Therefore, individual data elements may migrate between and among tiers and individual storage devices to reflect changes in both storage device tier classifications and data element tier classifications during operation of some tiered storage systems.

Requiring a host or storage controller to configure, monitor, and manage storage device tier configurations and/or related communication and data transfers among peer storage devices in a multi-device tiered storage system may create unnecessary overhead, transfer inefficiency, and processor and memory requirements for the controllers that do not scale well with the number of drives.

Therefore, there still exists a need for disaggregated storage architectures that distribute memory and compute resources across storage devices, such as SSDs, and enable reliable data management services in the face of changing configurations and increasing scale of storage systems.

SUMMARY

Various aspects for tiered storage on peer storage devices, particularly, handling of host data tiers among peer storage devices are described. In an innovative aspect, a storage device comprises a processor, a memory, at least one storage media, and an interface configured to communicate with a plurality of peer storage devices. A tier configuration is stored in the memory and identifies a local performance tier for data stored in the at least one storage medium and a peer performance tier for each of the plurality of peer storage devices. The local performance tier and each peer performance tier are selected from a plurality of performance tiers. A data handler is stored in the memory and executable by the processor to perform operations comprising receiving a host data command, determining a host data tier for the host data command, and selectively forwarding the host data command to a destination peer storage device selected from the plurality of peer storage devices in response to the host data tier being different than the local performance tier. The peer performance tier for the destination peer storage device matches the host data tier.

In various embodiments, the plurality of performance tiers may include a first performance tier and a second performance tier. The tier configuration may identify a first set of the plurality of peer storage devices assigned to the first performance tier and the first set of the plurality of peer storage devices have matching peer performance tiers. The tier configuration may identify a second set of the plurality of peer storage devices assigned to the second performance tier and the second set of the plurality of peer storage devices have matching peer performance tiers. The local performance tier may match the peer performance tiers of the plurality of peer storage devices assigned to the first performance tier. The data handler may perform further operations comprising receiving the host data command from a storage controller based on being identified as a receiving storage device in the first performance tier and selectively forwarding the host data command to a next storage device in the second performance tier in response to the host data tier matching the peer performance tier of the second performance tier.

In some embodiments, the data handler may perform further operations comprising querying at least one peer storage device for storage device status information using a storage device identifier, evaluating storage device status information for the at least one queried peer storage device, and selecting the destination peer storage device in response to evaluating storage device status information. A host data module may be stored in the memory and executable by the processor to perform operations comprising processing the host data command for data storage on the at least one storage media. The data handler may selectively forward the host data command to the host data module in response to the host data tier matching the local performance tier. More than one matching peer storage device may have the peer performance tier that matches the host data tier. The data handler may select the destination peer storage device using storage device status information for each of the more than one matching peer storage device. The data handler may select the destination peer storage device using a selection algorithm for distributing a plurality of host data commands among each of the more than one matching peer storage device.

In some embodiments, a tiered data manager may be stored in the memory and executable by the processor to perform operations comprising evaluating data tiering information of host data stored in the at least one storage medium to identify stored data units with host data tiers that do not match the local performance tier and selectively forwarding stored data units to a transfer peer storage device selected from the plurality of peer storage devices in response to host data tiers being different than the local performance tier. The peer performance tier for the transfer peer storage device may match host data tiers for the forwarded stored data units. Selectively forwarding stored data units may include transfer of a data history for each of the forwarded stored data units to the transfer peer storage device. Evaluating tiering information may be in response to a change in the local performance tier from a first performance tier of the plurality of performance tiers to a second performance tier of the plurality of performance tiers. At least one data tiering criterion may be stored in the memory. The data tiering information may include a data history for stored data units. The at least one data tiering criterion may be based on the data history for stored data units. Evaluating tiering information may be in response to a change in the data history for stored data units that results in an assigned host data tier for at least one stored data unit changing from a first performance tier of the plurality of performance tiers to a second performance tier of the plurality of performance tiers. The assigned host data tier may match the local performance tier before the change and be different than the local performance tier after the change.

In another innovative aspect, a computer-implemented method for execution by a storage device selectively forwards host data commands to peer storage devices. Storage device identifiers are stored for a plurality of peer storage devices in a first storage device. A tier configuration is stored that identifies a local performance tier for data stored in the first storage device and a peer performance tier for each of the plurality of peer storage devices. The local performance tier and each peer performance tier are selected from a plurality of performance tiers. A host data command is received. A host data tier is determined for the host data command. The host data command is selectively forwarded from the first storage device to a destination peer storage device selected from the plurality of peer storage devices in response to the host data tier being different than the local performance tier. The peer performance tier for the destination peer storage device matches the host data tier.

In various embodiments, the plurality of performance tiers may include a first performance tier and a second performance tier. The tier configuration may identify a first set of the plurality of peer storage devices assigned to the first performance tier and each of the plurality of peer storage devices in the first set may have a first matching peer performance tier with each other peer storage device in the first set. The tier configuration may identify a second set of the plurality of peer storage devices assigned to the second performance tier and each of the plurality of peer storage devices in the second set may have a second matching peer performance tier with each other peer storage device in the second set. The first storage device may be assigned to the first performance tier and have the first matching peer performance tier. The host data command may be received from a storage controller to the first storage device before being selectively forwarded to the second performance tier in response to the host data tier matching the peer performance tier of the second performance tier. Data from the host data command may be stored in the first storage device in response to the host data tier matching the local performance tier.

In some embodiments, selectively forwarding the host data command from the first storage device to the destination peer storage device comprises querying at least one peer storage device for storage device status information using a storage device identifier, evaluating storage device status information for the at least one queried peer storage device, and selecting the destination peer storage device in response to evaluating storage device status information. Data tiering information of host data stored in the first storage device may be evaluated to identify stored data units with host data tiers that do not match the local performance tier. Stored data units may be selectively transferred to a transfer peer storage device selected from the plurality of peer storage devices in response to host data tiers being different than the local performance tier. The peer performance tier for the transfer peer storage device may match host data tiers for the forwarded stored data units.

In yet another innovative aspect, a storage system comprises a plurality of peer storage devices and each storage device comprises at least one storage media. Means are provided for storing a local performance tier for the at least one storage media. The local performance tier is selected from a plurality of performance tiers. Means are provided for storing storage device identifiers for the plurality of peer storage devices. Means are provided for evaluating data tiering information of host data stored in the at least one storage medium to identify stored data units with host data tiers that do not match the local performance tier. Means are provided for selectively forwarding stored data units to a transfer peer storage device selected from the plurality of peer storage devices in response to host data tiers being different than the local performance tier. The peer performance tier selected from the plurality of performance tiers for the transfer peer storage device matches host data tiers for the forwarded stored data units.

In various embodiments, means may be provided for initiating the means for evaluating data tiering information in response to a tiering change. The tiering change may be selected from: a performance change in the local performance tier from a first performance tier of the plurality of performance tiers to a second performance tier of the plurality of performance tiers; a data tier change in the host data tiers of the stored data units; or a data criteria change in at least one data tiering criterion used to determine the host data tiers. Means may be provided for storing a tier configuration identifying a peer performance tier selected from the plurality of performance tiers for each of the plurality of peer storage devices. Means may be provided for receiving a host data command. Means may be provided for determining a host data tier for the host data command. Means may be provided for selectively forwarding the host data command to a destination peer storage device selected from the plurality of peer storage devices in response to the host data tier being different than the local performance tier. The peer performance tier for the destination peer storage device may match the host data tier. Means may be provided for receiving storage device status information from the plurality of peer storage devices. Means may be provided for evaluating storage device status information for at least one peer storage device from the plurality of peer storage devices. Means may be provided for selecting a destination peer storage device in response to evaluating storage device status information.

The various embodiments advantageously apply the teachings of multi-device tiered storage systems to improve the functionality of such computer systems. The various embodiments include operations to overcome or at least reduce the issues in the previous storage systems discussed above and, accordingly, are more efficient and scalable than other computer data storage architectures for some applications. That is, the various embodiments disclosed herein include hardware and/or software with functionality to improve the efficiency and scalability of tiered data management operations, based on managing host data tiers across a plurality of peer storage devices. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
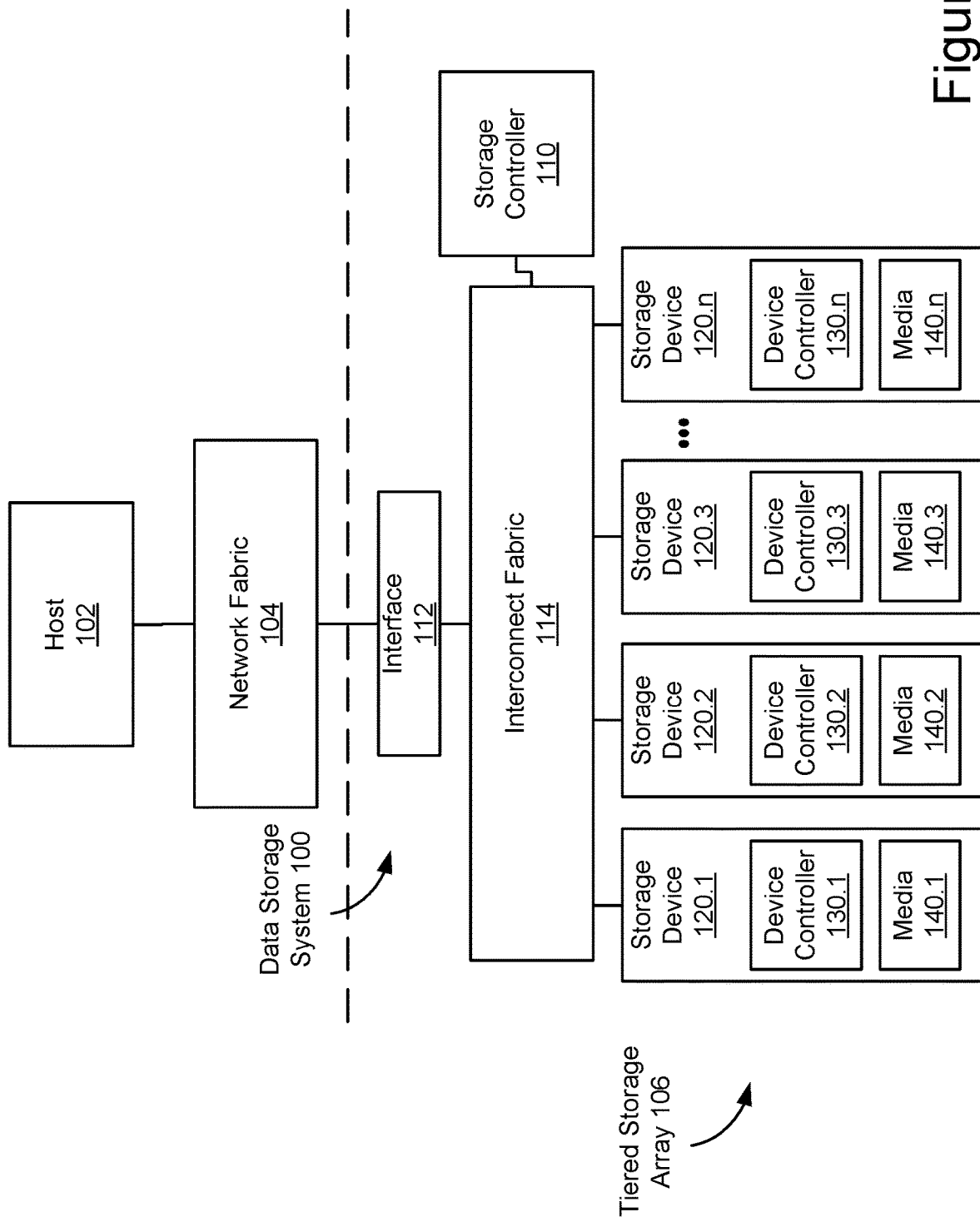
FIG. 1 schematically illustrates an example of a tiered storage system.

FIG. 1 shows an embodiment of an example tiered data storage system 100. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or memory devices).

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single media device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 is coupled to data storage devices 120.1-120.n through interconnect fabric 114. However, in some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, or storage virtualization controller (SVC). In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110 is a component and/or subsystem of host 102 (described below).

In some embodiments, host 102 is coupled to data storage system 100 through interface 112 over a network fabric 104. In some embodiments, multiple hosts 102 (only one of which is shown in FIG. 1) are coupled to data storage system 100 through interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, however, storage controller 110, the one or more device controllers 130, and media devices 140 are included in the same device (i.e., an integrated device) as components thereof. Furthermore, in some embodiments, one or more of the storage devices 120 (e.g., including storage controller 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with storage controller 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
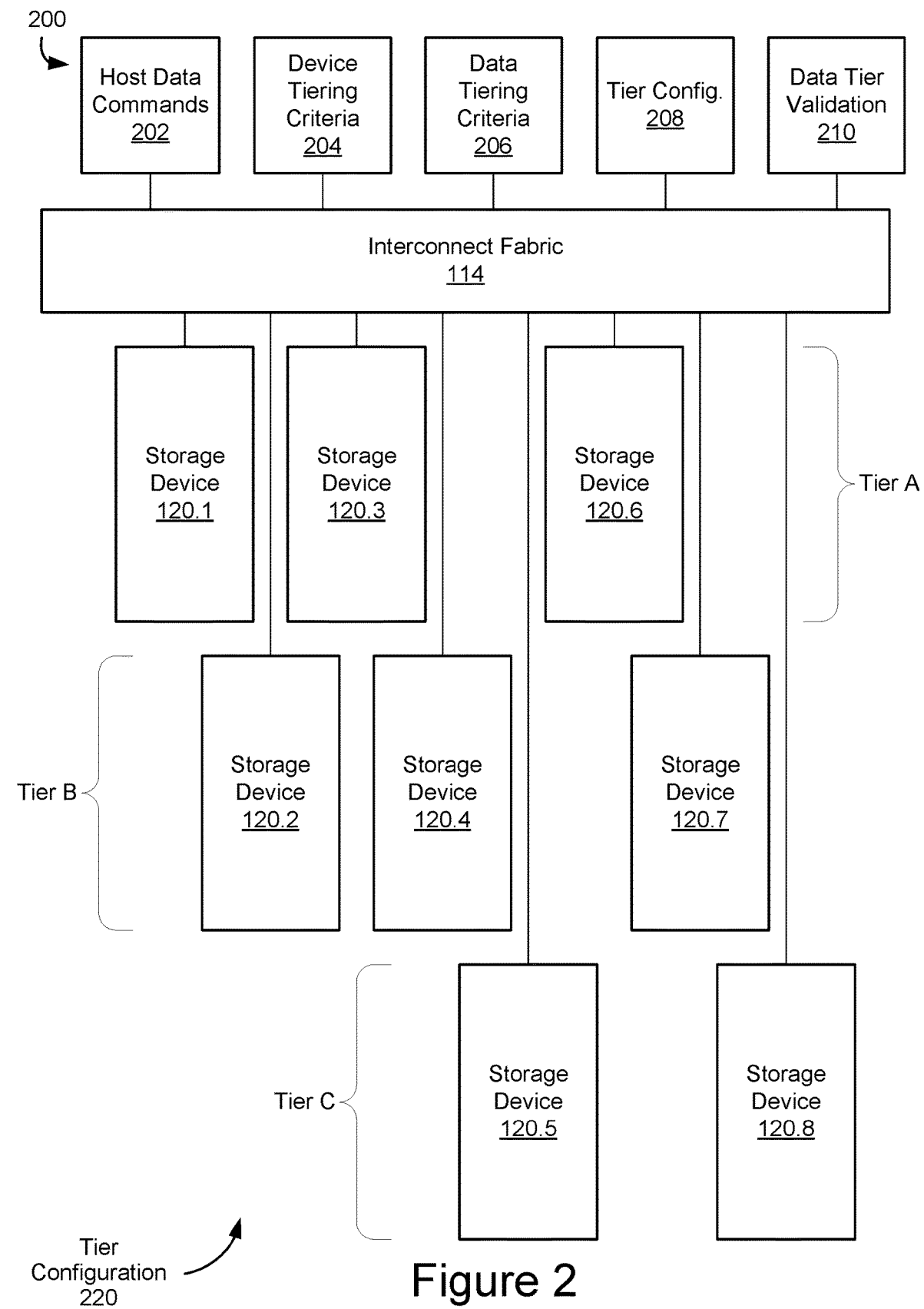
FIG. 2 schematically illustrates an example tier configuration and command modules for the tiered storage system of FIG. 1.

FIG. 2 is a block diagram illustrating an an example tier configuration 220 and command modules 200 for the data storage system 100, in accordance with some embodiments, as shown in FIG. 1. In the example shown, eight storage devices 120.1-120.8 are configured in three storage tiers 220.1-220.3. Each of storage devices 120.1-120.8 may communicate with the other storage devices through interconnect fabric 114. In some embodiments, interconnect fabric 114 may provide a peer communication channel among storage devices 120.1-120.8 regardless of which tier each storage device belongs to.

Storage tier A 220.1 may include storage devices 120.1, 120.3, and 120.6. Storage tier B 220.2 may include storage devices 120.2, 120.4, and 120.7. Storage tier C 220.3 may include storage devices 120.5 and 120.8. Each storage tier and the storage devices they contain may be represented collectively as tier configuration 220. In some embodiments, storage tiers 220.1-220.3 may be performance tiers where each set of storage devices has a common range of one or more performance characteristics.

Each storage tier 220.1-220.3 may represent a set of storage devices of a specified type, where each storage device type has shared parameters used to define the type for each tier. For example, in some tier configurations, tiers may be defined by a combination of media type and performance type, such as enterprise-class SSD, enterprise-class HDD, and desktop-class HDD. In this example, however, the storage devices in each tier may be relatively static because they are based solely on product specifications of the different storage devices. More dynamic types may be defined around effective capacity, actual I/O performance, endurance/wear, and/or overall health (represented by error rates, bad blocks/devices, etc.) and may be appropriate for tiered storage systems with tiering within a device media type (such as SSDs) and/or among storage devices with similar product performance characteristics. In some embodiments, storage devices 120.1-120.8 may have the same product specifications and/or limited product variations, such as differing capacities, but other product specifications being the same or similar.

In FIG. 2, storage devices 120.1-120.8 are shown schematically with positions that align with their respective tiers. This may be for visual organization of the schematic only. In some embodiments, each of storage devices 120.1-120.8 may occupy a similar bay within a storage rack unit and be arranged physically based on interconnect availability and the physical organization of the storage system they are installed in. In some embodiments, the physical location of each of storage devices 120.1-120.8 may have no relationship to storage tiers 220.1-220.3. For example, storage devices 120.1-120.8 may be arranged sequentially in adjacent bays from 120.1-120.8, even though storage device 120.2 is not in the same tier as the adjacent storage device 120.1 and storage device 120.3. In some embodiments, storage devices 120.1-120.8 may initially be positioned according to their tiers, but their tier assignment may change over time, while their physical position does not.

Storage devices 120.1-120.8 are configured to receive host data commands 202, such as host read operations, host write operations, host copy operations, host erase operations, and data management operations. Storage devices 120.1-120.8 may execute those operations, generally with regard to their respective storage media or other storage device resources (such as non-volatile cache, operating memory, processors, or other specialized hardware/software). In some embodiments, host data commands 202 may originate with host 102 and may be routed through storage controller 110. Storage tiers 220.1-220.3 may be used to rout host data commands 202 to a storage device in the storage tier that matches the data storage criteria for a particular host data command. For example, there may be data write criteria associated with each of storage tiers 220.1-220.3 that are evaluated for each host data command 202. In some embodiments, each host data command 202 may include a session variable, metadata, or other storage tier indicator that correlates to the available storage tiers 220.1-220.3 and may be used for selecting a destination storage device for the host data command.

In some embodiments, tiered storage management commands may be received by storage devices 120.1-120.8. For example, device tiering criteria command 204, data tiering criteria command 206, tier configuration command 208, and data tier validation command 210 may be received from host 102, storage controller 110, or another storage device. One or more of storage devices 120.1-120.8 may receive and process tiered storage management commands. For example, storage device 120.1 may be identified as a tiered storage leader and tiered storage management commands may be directed to storage device 120.1 for processing. In some embodiments, tiered storage management commands may be directed to any or all of storage devices 120.1-120.8 without a designated tiered storage lead.

Device tiering criteria command 204 may provide tiering criteria parameters to storage devices 120.1-120.8. For example, tiering criteria command 204 may include a set of storage device tiering criteria for each tier of storage defined for tier configuration 220. In the example shown, tiering criteria command 204 may define three sets of tiering criteria parameters for storage tiers 220.1-220.3 respectively. For example, tier A 220.1 may be SSDs with at 50% or less of their endurance spent, tier B 220.2 may be SSDs with 51-80% of their endurance spent, and tier C 220.3 may be SSDs with greater than 80% of their endurance spent. In some embodiments, tiering criteria command 204 may be used to provide initial storage tiering criteria when tier configuration 220 is initiated. Tiering criteria command 204 may be used to update tiering criteria during the operating life of tiered storage array 106. For example, a complete set of tiering criteria parameters may be provided after the initial tier configuration or a subset of tiering criteria parameters to modify the prior set of tiering criteria parameters may be provided. In some embodiments, device tiering criteria may not be provided to storage devices 120.1-120.8 in favor of providing tier configuration 220 via tier configuration command 208.

Data tiering criteria command 206 may include data tiering criteria parameters to storage devices 120.1-120.8. For example, each set of storage tiering criteria parameters may have a corresponding set of data tiering criteria parameters to determine what data elements should be stored in which of storage tiers 220.1-220.3. Storage devices 120.1-120.8 may store device and/or data tiering criteria parameters in one or more data structures within storage devices 120.1-120.8 in response to receiving device tiering criteria command 204 and/or data tiering criteria command 206. For example, storage devices 120.1-120.8 may include a device tiering criteria table and/or a data tiering criteria table. In some embodiments, the tiering criteria from device tiering criteria command 204 and/or data tiering criteria command 206 may be stored in storage array metadata describing various configuration and parameter settings of tiered storage array 106 and replicated in each of storage devices 120.1-120.8.

Tier configuration command 208 may be received by storage devices 120.1-120.8 to provide or modify the assignment of storage devices 120.1-120.8 to the storage tiers 220.1-220.3. For example, a storage system or an administrative user of the system may determine which storage devices 120.1-120.8 should be assigned to storage tiers 220.1-220.3 based on defined tiering criteria. Tier configuration command 208 may provide an updated storage tier assignment entry for one or more storage devices 120.1-120.8 or a complete tier configuration to override a prior tier configuration. In some embodiments, a tier configuration command 208 may not be provided in favor of storage devices 120.1-120.8 organizing themselves into tier configuration 220 based on device tiering criteria, such as device tiering criteria received in device tiering criteria command 204.

Data tier validation command 210 may be received by storage devices 120.1-120.8, individually or collectively, to initiate a process for checking the match between each storage device's assigned storage tier and the data tier of data elements stored on the storage device's storage media. For example, based on a periodic schedule, change in configuration, or change in device or data tiering criteria one or more storage devices may receive data tier validation command 210 to check some or all of their stored data elements to validate that the data tier still matches the storage tier. In some embodiments, data tier validation command 210 may specify data elements (such as data objects, address blocks, etc.) to be validated, such as when the data elements or data tiering criteria have changed since they were stored. In some embodiments, some or all data elements may be validated on a periodic basis or during periods when the storage device has extra processing, memory, and/or I/O resources. In some embodiments, storage devices 120.1-120.8 may execute their own data validations without receiving a data tier validation command 210 from another system or component.

Figure 3:
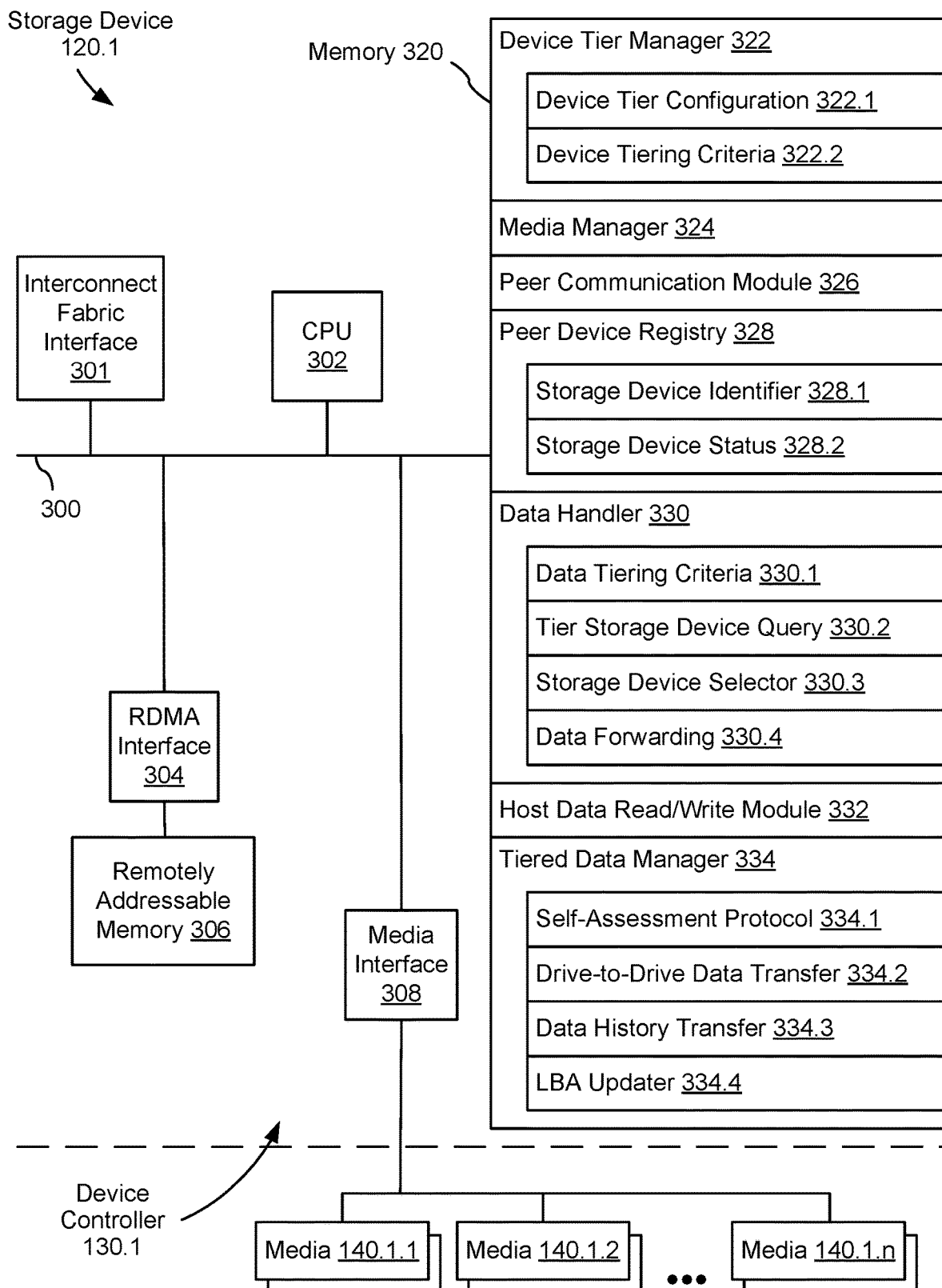
FIG. 3 schematically illustrates an example of a storage device of the tiered storage system of FIG. 1.

In some embodiments, as shown in FIG. 3, a storage device 120.1 includes the functions of a device controller 130.1 and tier manager 322 using common compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, RDMA interface 304, media interface 308, and any number of additional modules, such as erasure coding engines, error correction engines, specialized memory modules, etc., in order to coordinate the operation of these components. In some embodiments, the components of storage device 120.1 may be interconnected by one or more communication buses 300. In some embodiments, CPU 302, memory 320, media interface 308, and any number of additional modules may be packaged as a device controller 130.1, such as an NVM controller, implemented in an application-specific integrated circuit (ASIC), system on a chip (SoC), field programmable gate array (FPGA), or similar architecture.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of media controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or RDMA interface 304, may also include or utilize memory and/or compute resources and may be part of the available local resources of storage device 120.1.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from memory locations in other storage devices, storage controllers (e.g. storage controller 110), or servers (e.g. host 102).

Additional modules (not shown) supporting one or more functions of storage device 120 may be connected to CPU 302, RDMA interface 304, media interface 308, and memory 320. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by a host 102, storage controller 110 receives a host write command (e.g., in a set of one or more host write commands) via interface 112 (FIG. 1), translates that host write command into a write command, sometimes called a translated command or translated write command, suitable for execution by a data storage device 120, and sends the translated host data command to one or more data storage devices corresponding to one more addresses specified by the host write command, a destination storage device.

In some storage systems, a storage controller also receives, via interface 112, data to be stored in the one or more data storage devices corresponding to the one more addresses specified by the host write command. A respective data storage device receives the data to be stored in its media devices 140.1.1-140.1.n, or a portion of the data to be stored, from the storage controller via the interconnect fabric 114. The data received by the storage device may be encoded or otherwise processed and made available to storage media interface 308, which transfers the data to media devices 140.1 in a manner dependent on the type of storage medium being utilized. In storage device 120, RDMA interface 304 and remotely addressable memory 306, sometimes in conjunction with coordination from storage controller 110, may allow host 102 to send the data to be stored in the host write command to remotely addressable memory 306 in storage device 120 without them passing through storage controller 110 or another storage controller.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis).

In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

In addition, these various memory cell configurations and encoding formats may impact the lifetime performance of storage device 120.1. Flash memory may have defined I/O performance, endurance, write voltage thresholds, error rates, cell/device failures, and other parameters that may be tracked for specific performance values and/or contributions to storage capacity, performance class, endurance, and/or overall health. Similarly, cell usage, read and write load balancing, garbage collection, and other operations may be tracked for endurance, reliability, and failure prediction for media devices 140.

FIG. 3 is a block diagram illustrating tier management handled by storage device 120.1 and its peer storage devices 120, in accordance with some embodiments. Storage device 120.1 includes CPU 302 for executing modules, programs, and/or instructions stored in memory 320 and thereby performing processing operations, memory 320 (sometimes called NVM controller memory, device controller memory, or operating memory), and one or more communication buses 300 for interconnecting these components.

The one or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, media devices 140.1, and any additional module(s) by the one or more communication buses 300. In some embodiments, interface hardware and/or protocols for providing communication through communication buses 300 may also be present for communication with any given component.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:
- tier manager 322 for organizing tier configurations in conjunction with peer storage devices and/or commands from other systems or subsystems, such as storage controller 110 or host 102
- media manager 324 for managing storage device FTL data (including logical address mapping) and related processes and requests, such as media read and write operations through media interface 308 to media devices 140.1.1-140.1.n;
- peer communication module 326 for communicating command messages and data transfers between storage devices 120 through interconnect fabric interface 301, sometimes using access to remotely addressable memory 306, without the intervention of host 102, storage controller 110, or similarly distinct control systems;
- peer device registry 328 for identifying the storage device identifiers of peer storage devices and/or storing other data management and/or hosted services information related to each other storage device;
- data handler 330 for receiving, parsing, and/or forwarding host data and/or related host data commands;
- host data read/write module 332 managing host data commands directed to data storage on media devices 140.1 in cooperation with media manager 324; and
- tiered data manager 334 for evaluating data tiers of stored host data and forwarding mismatched data in media devices 140.1 to a matching storage tier.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

Device tier manager 322 may store a device tier configuration 322.1 for use in identifying the storage or performance tier of peer storage devices for routing data commands. For example, device tier configuration 322.1 may be received from host 102, storage controller 110, or another device using tier configuration command 208 and stored in a data structure for later use. In some embodiments, device tier manager 322 may provide an offloaded and/or distributed service to enable storage device 120.1 and its peer storage devices to organize tier configurations for tiered storage array 106. Tier configuration 322.1 may be a data structure describing two or more storage tiers and which storage devices in tiered storage array 106 belong to which tier. One or more lists, tables, arrays, or other data structures may be used to associate a storage tier identifier with each corresponding storage device assigned to that tier. In some embodiments, storage tier identifiers may be stored in peer device registry 328 for each storage device to provide tier configuration 322.1. For example, a peer performance tier value may be stored in an entry for each storage device in peer device registry 328.

In some embodiments, tier manager 322 may include storage device tiering criteria 322.2. For example, storage device tiering criteria 322.2 may include one or more performance indicators associated with storage devices 120, such as available storage capacity, performance class, endurance, overall health, age, error rate, etc. For each performance indicator, tiering criteria 322.2 may define a performance metric range or threshold for describing the performance characteristic and determining whether each storage device meets the performance characteristic. In some embodiments, tiering criteria 322.2 may be provided in a data structure, such as one or more lists, tables, arrays or other data structures.

In some embodiments, device tier configuration 322.1 and/or device tiering criteria 322.2 may be loaded into tier manager 322 during initial configuration of storage device 120.1 and/or tiered storage array 106, or during similar initialization or configuration events. In some embodiments, device tier configuration 322.1 and/or device tiering criteria 322.2 may be received in a data management command from a host, storage controller, or peer storage device. For example, an administrative user of host 102 may use a data management application to configure or modify device tier configuration 322.1 and/or device tiering criteria 322.2 for use going forward and send appropriate data management commands to storage device 120.1 and/or other systems or subsystems storing and using device tier configuration 322.1 and/or device tiering criteria 322.2.

In some embodiments, tier manager 322 in storage device 120.1 may act as a tier configuration lead storage device for a peer-to-peer tier configuration. For example, tier manager 322 may be configured or receive a data management command to generate a new storage tier configuration 322.1 based on storage device tiering criteria 322.2 and performance parameters of each storage device 120 in tiered storage array 106.

In some embodiments, tier manager 322 may also designate the storage tier of storage device 120.1 as the local performance tier. The local performance tier may be the storage tier of a storage device currently processing a host data command, such that a match between the local performance tier and the data tier of the host data command may indicate that the host data command may be processed with reference to media devices 140 without forwarding to a peer storage device.

In some embodiments, media manager 324 manages access to and maintenance of media devices 140.1. For example, media manager 324 may include base FTL services for storage device 120 and manages the storage device FTL map, as well as read, write, and data management access to media devices 140. Host commands involving host data reads, writes, erases, etc. may be directed by media manager 324 through media interface 308 for accessing media devices 140.1. In some embodiments, host data commands may be pre-processed by data handler 330 and/or host data read/write module 332, and related internal data access commands may be received by media manager 324. In some embodiments, storage device FTL provides a base level of FTL mapping for storage device 120. Storage device FTL may include allocation of storage locations with a defined size based on compatibility of with storage units in media devices 140.1, such as page size. For example, storage locations may be allocated as 4 KB or 8 KB pages. In some embodiments, allocation sizes for storage locations may correspond to larger multiplane NVM page sizes, such as 96 KB.

Media manager 324 may be responsible for bad block management, bad block spare overprovisioning, and allocation of gap free logical space throughout the life of the media devices 140.1. In some embodiments, media manager 324 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). Media manager 324 may enable reads from logical block address (LBA) storage locations in media devices 140 to write in remotely addressable memory 306 and reads from remotely addressable memory 306 to writes in LBA storage locations in media devices 140.1. In some embodiments, media manager 324 does not manage any RAID-related redundancy or striping across the NVM under its management and RAID groups and striping may be managed across the storage devices in a distributed fashion.

In some embodiments, peer communication module 326 may provide communication among storage devices 120 using interconnect fabric 114 without being routed through storage controller 110 or another host or controller component. For example, peer communication module 326 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, etc. In some embodiments, packetized messages may be routed among storage devices 120.1 using one or more network communication protocols compatible with interconnect fabric 114.

In some embodiments, peer communication module 326 operates in conjunction with RDMA interface 304 to manage local and remote use of remotely addressable memory 306. For example, local operations by media manager 324 may include writes and reads to remotely addressable memory 306, read/write operations may include coordinated use of space in remotely addressable memory 306 for both local and remote access, and other distributed operations may use space in remotely addressable memory 306 as requested by storage controller 110 or other storage devices.

In some embodiments, peer device registry 328 may be a data structure for maintaining information regarding each other peer storage device in a peer group, such as storage devices 120 in tiered storage array 106. For example, peer device registry 328 may be a table, list, array, database, or similar data structure for storing storage device identifiers 328.1, other addressing information, storage device status indicators 328.2, and/or additional information on peer storage devices, such as specifications and/or parameters of the storage devices.

In some embodiments, peer device registry 328 may include storage tier identifiers 328.1 for each storage device corresponding to tier configuration 322.1. For example, each storage device may have an entry (e.g. a row in a table) with a key (e.g. storage device identifier) and a field (e.g. column in a table) for a storage tier identifier (e.g. numeric value 1-n corresponding to storage tier assignment). In some embodiments, peer device registry 328 may include storage device status indicators 328.2 for storing read/write status information for each peer storage device. For example, peer storage devices may broadcast or respond to queries regarding their readiness to receive a host read/write or data management command and the related status information may be stored as storage device status indicators 328.2. In some embodiments, peer device registry 328 may be stored in storage array metadata repeated in each storage device in tiered storage array 106.

In some embodiments, storage device 120.1 may include a data handler 330 that receives host data commands and routes them based on their data tier for storage device 120.1. For example, data handler 330 may receive a host write command, determine the corresponding data tier, and identify a storage device in the performance tier in which it should be stored. Data handler 330 may then forward the host write command to the destination peer storage device.

In some embodiment, data handler 330 may include data tiering criteria 330.1 for determining the data tier of the host data command. For example, data tiering criteria 330.1 may include source, user, destination, metadata, state/session variables, and/or other parameters associated with a host data command to determine the data tier of the host data command. In some embodiments, the host data command may include a flag or other variable that specifically designates the data tier without requiring further analysis of parameters and data tiering criteria 330.1. Identification of the data tier may be matched to the storage tier of a set of peer storage devices (that may or may not include the storage device currently processing the command).

In some embodiments, data handler 330 may include a tier storage device query 330.2. For example, data handler 330 may collect one or more parameters related to the set of peer storage devices in the performance tier corresponding to the data tier of the host data command. In some embodiments, tier storage device query 330.2 may be directed through peer communication module 326 to each peer storage device in the appropriate storage tier and request confirmation of storage tier and availability for the host data command. In some embodiments, tier storage device query 330.2 may read storage device status information from storage device status indicators 328.2 and may selectively initiate an update query to a peer storage device. For example, peer storage device status indicators 328.2 may include timestamp information and after a set period an update query may be sent to validate and/or update peer storage device status indicators 328.2.

In some embodiments, data handler 330 may include a storage device selector 330.3 to select which storage device among a set of storage devices having matching storage tiers (that also match the data tier) may receive the host data command. For example, storage device selector 330.3 may use peer storage device status indicators 328.2 to determine which peer storage devices are available to receive the command and then apply a selection algorithm. The selection algorithm may use round-robin, period since a prior command was sent to (or status received from) each storage device, or more complex algorithms based on available capacity, I/O performance, endurance, overall load balancing and/or wear levelling, etc. for selecting the destination storage device. In some embodiments, data handler 330 may select storage device 120.1 as the destination storage device and the selection algorithm in storage device selector 330.3 may give preference to storage device 120.1 as a default storage location in the local performance tier.

In some embodiments, data handler 330 may include a data forwarding module 330.4 for forwarding data commands to the destination storage device selected by storage device selector 330.3. For example, data handler 330 may issue a data command similar or identical to the host data command for processing by the destination storage device. In some embodiments, the forwarded data command may include a storage device identifier for both the destination storage device and the sending storage device, as well as corresponding storage tier information. In some embodiments, data forwarding module 330.4 may forward the data command to a peer storage device using peer communication module 326 and/or remotely addressable memory 306. In some embodiments, data handler 330 may receive status information back from the destination storage device to confirm that the data command was received and processed and, in the event of a failed attempt, may include an algorithm for retry attempts before returning to storage device selector 330.3 for selecting an alternate destination storage device.

In some embodiments, data forwarding module 330.4 may not be used for processing the data command for storage to local media devices 140 and, in the event that the data command is not forwarded, operation of data handler 330 may pass operation directly to host data read/write module 332 for handling read/write operations based on the host data command. In some embodiments, an internal data command is forwarded from data handler 330 to host read/write module 332 for local data processing if storage device 120.1 is selected by storage device selector 330.3 as the destination storage device.

In some embodiments, host data read/write module 332 may enable storage device 120.1 to process the host data command as it normally would for received host data commands if data handler 330 was not present. For example, host data read/write module 332 may parse the received host data command and generate one or more internal read, write, or other data operations for processing to media devices 140 by media manager 324. Host read/write module 332 may include the default host read/write path for storage device 120.1 and include local LBA and FTL operations associated with reads and writes to media devices 140.1.

In some embodiments, storage device 120.1 and other peer storage devices 120 may include tiered data manager 334 for self-assessing the host data stored in media devices 140.1 for their match to their local performance tier. Because the data tier of host data may change over time (e.g. data aging and/or I/O volume or frequency may be data tiering criteria) and storage tiers of storage devices 120 may change over time, host data that once matched the local performance tier may cease to match when these changes occur. Tiered data manager 334 may be able to detect such tiering changes. Tiered data manager 334 may provide the logic for assessing the performance match of previously stored host data and automatically transferring host data that no longer matches to another storage tier and peer storage device that does match.

Tiered data manager 334 may include a self-assessment protocol 334.1 that selects data units, such as data blocks, objects, pages, or other units, and evaluates their tiering information. For example, self-assessment protocol 334.1 may compare the data unit's current data tier to the current storage tier of storage device 120.1. In some embodiments, self-assessment protocol 334.1 may use device tiering criteria 322.2 and/or data tiering criteria 330.1 to perform updated calculations and/or comparisons of storage tier and data tier. In some cases, local performance tier may be unchanged and self-assessment protocol 334.1 may be based solely on changes to the data tier and in other cases the data tier may be unchanged but the local performance tier has changed.

Self-assessment protocol 334.1 may also include logic for when the protocol is triggered or initiated in response to a tiering change. Example tiering changes may include: a performance change in the local performance tier from one performance tier to another performance tier; a data tier change in the host data tiers of the stored data units; or, a data criteria change in at least one data tiering criteria used to determine the host data tiers. In some embodiments, logic for initiating a self-assessment may include a tiering change assessment schedule, monitoring for specific events related to tiering changes, such as the receipt of device tiering criteria command 204 or data tiering criteria command 206, and/or receiving a specific command to initiate an assessment, such as data tier validation command 210.

Tiered data manager 334 may also include a drive-to-drive data transfer module 334.2 for transferring data units subject to a tiering change to a peer storage device. For example, when self-assessment protocol 334.1 identifies a data unit as having a tiering change, drive-to-drive transfer module 334.2 may use data handler 330 to identify a peer storage device to be the destination storage device for moving the data unit. In some embodiments, drive-to-drive data transfer module 334.2 may formulate a data command to write the host data unit being transferred and data handler 330 may handle it similarly to a host data command. In some embodiments, drive-to-drive transfer module 334.2 may use data handler 330 or similar logic only to identify a destination storage device, then use a drive-to-drive data transfer protocol, such as using peer communication module 326 and remotely addressable memory 306, to move the data units to the destination storage device.

Tiered data manager 334 may also include a data history transfer module 334.3. In some embodiments, data tiering criteria may be based on data history, such as data age and/or I/O history, and the data history may be preserved during drive-to-drive transfers. For example, data history transfer module 334.3 may include metadata with the transferred data units that includes the data history.

Tiered data manager 334 may also include an LBA updater 334.4 to ensure that host LBA information is maintained or updated during the transfer. In some embodiments, host LBA information may be offloaded and distributed across peer storage devices and LBA updater 334.4 may send an LBA update command to the peer storage device containing the relevant portion of LBA mapping information. In some embodiments, LBA mapping information may be maintained by host 102 and/or storage controller 110 and an appropriate LBA update or move status message may be sent to the system maintaining the host LBA mapping information. Tiered data manager 334 may wait for confirmation of the successful transfer to the destination storage device before providing the LBA update and/or erasing or reallocating the storage location in media devices 140.1 that previously held the data unit.

Figure 4:
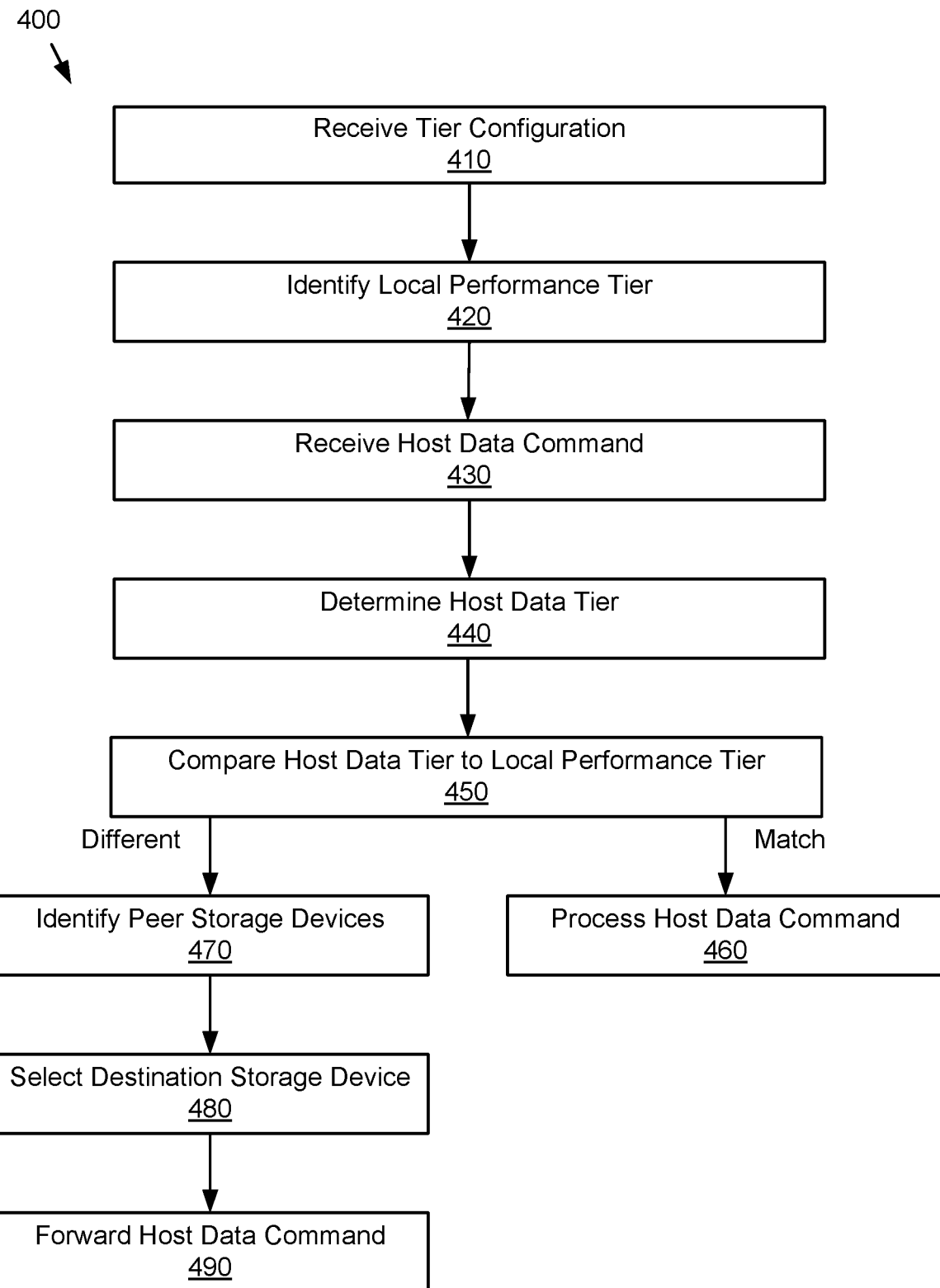
FIG. 4 illustrates an example of a method for routing host data commands in a storage tier configuration using a storage device.

As shown in FIG. 4, storage device 120.1 operating within data storage system 100 may be operated according to a tiered storage data routing service for routing host data commands among peer data storage devices 120 according to a tier configuration. For example, storage device 120.1 may respond to one or more host data commands from a storage controller (e.g. storage controller 110), a host (e.g. host 102), and/or one or more peer storage devices (e.g. storage devices 120) to handle host data commands according to the method 400 illustrated by blocks 410-490 of FIG. 4.

At block 410, a tier configuration may be received by a storage device. For example, when a host, server, peer storage device, or other network system using the data storage system needs to initiate or reconfigure a tiered storage array, a tier configuration may need to be available for use in identifying individual storage devices as members of defined storage tiers. In some embodiments, a tier configuration may be defined for the tiered storage array during an initiate setup or configuration of storage system 100 and/or one or more storage devices 120 and the tiering criteria may be stored in a data structure within or accessible to storage devices 120. In some embodiments, a tier configuration may be provided to storage devices 120 initially, periodically, or on demand through a tier configuration command that includes complete or updated tier configuration information.

At block 420, a local performance tier is identified for a particular storage device. For example, the storage tier for the storage device in the tier configuration may be accessed to identify the local performance tier. In some embodiments, the storage device may include device tiering criteria and internal logic for determining its storage or performance tier.

At block 430, a host data command may be received by the storage device. For example, a host data command may be directed to the storage device by a host, storage controller, or peer storage device. In some embodiments, the host data command may first be directed to a storage device designated as a command routing lead and/or selected as belonging to a specific storage or performance tier, such as the highest or lowest storage tier.

At block 440, the host data tier for the data units related to the host data command may be determined. For example, the host data tier may be included in the host data command as a parameter and/or read from metadata, session variables, connection variables, or other parameters. In some embodiments, the storage device may have access to data tiering criteria and apply the data tiering criteria to one or more parameters of the host data command and/or related data units to determine the host data tier.

At block 450, the host data tier is compared to the local performance tier to determine whether they match or are otherwise compatible. For example, the tier configuration may define three storage tiers as performance tier A, performance tier B, and performance tier C. These performance tiers may map to host data tiers A, B, and C such that a host data command with host data tier A matches performance tier A. In some embodiments, a more complex relationship may be defined for matching host data tiers to performance tiers. For example, host data tiers may be defined in a range from 1-9, while there are still only performance tiers A, B, and C. A matching logic may be provided that maps host data tiers 1-3 to performance tier A, host data tiers 4-6 to performance tier B, and host data tiers 7-9 to performance tier C. If there is a match, operation may proceed to block 460. If the host data tier is different from the local performance tier, operation may proceed to block 470.

At block 460, the host data command may be processed by the storage device with a matching local performance tier. For example, the storage device that received the host data command has identified itself as a compatible performance tier for the command and may proceed to process it as a read/write command intended for its storage media. In some embodiments, a host data command with a matching local performance tier may still be forwarded to another storage device in the same performance tier. For example, the storage device may identify the other peer storage devices in its performance tier and use an algorithm to evaluate whether another destination storage device should be used and forward the host data command in operations similar to blocks 470-490, but with itself included in the set of peer storage devices.

At block 470, a set of peer storage devices having a different performance tier than the local performance tier may be identified. For example, if the host data tier was determined to be performance tier B and the processing storage device is performance tier A, the processing storage device may use the tier configuration to identify the set of peer storage devices with performance tier B.

At block 480, a destination storage device is selected from the set of peer storage devices identified at block 470. For example, the set of peer storage devices with performance tier B may include three peer storage devices. The processing storage device may implement an algorithm for selecting a destination storage device from among the peer storage devices.

At block 490, the processing storage device forwards the host data command or a similar data command to the destination storage device. For example, the processing storage device may use the storage device identifier for the destination storage device to initiate a peer message or drive-to-drive data transfer to send the data command to the destination storage device.

Figure 5:
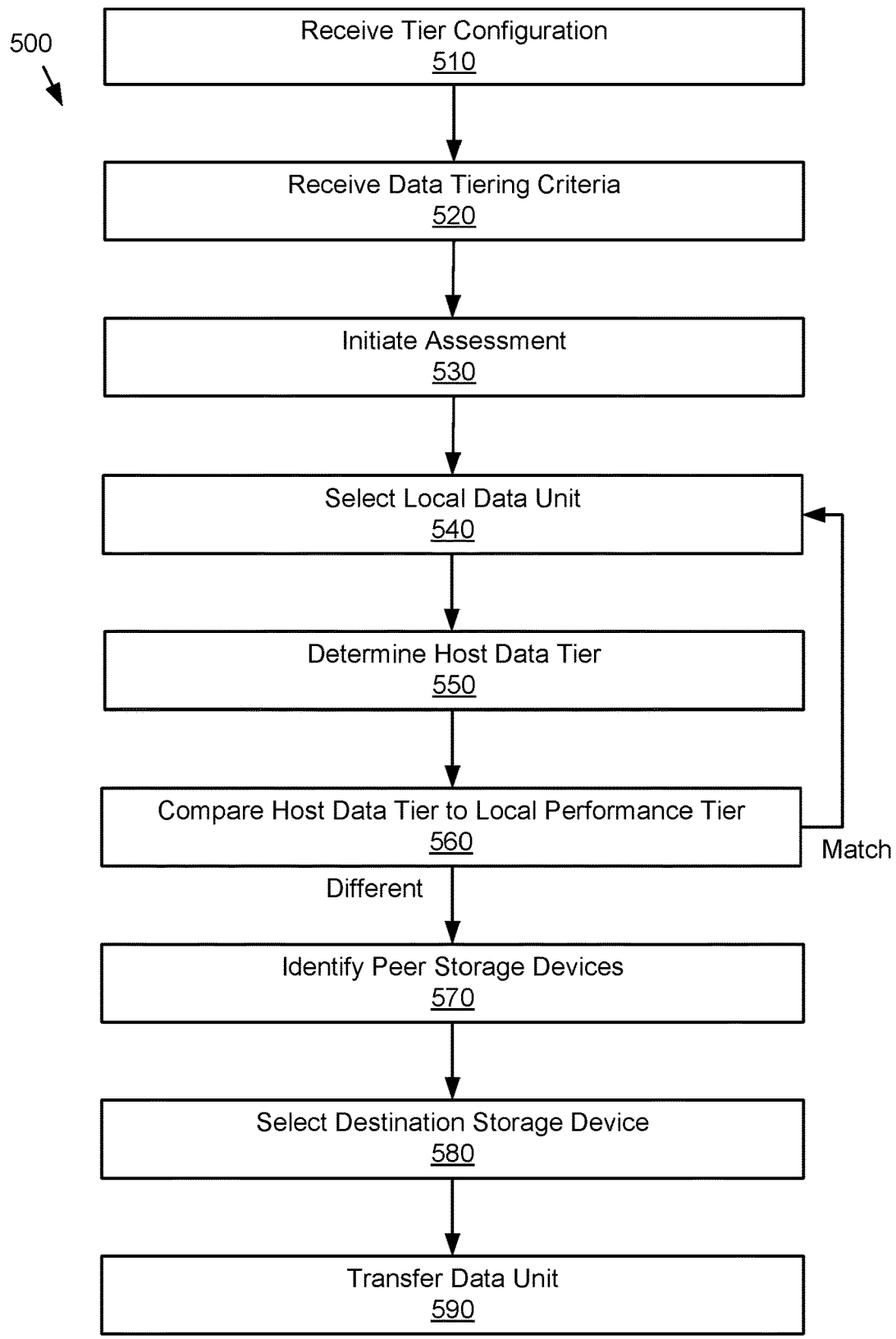
FIG. 5 illustrates an example of a method for transferring host data in a storage tier configuration using a storage device.

As shown in FIG. 5, storage device 120.1 operating within data storage system 100 may be operated according to a tiered storage data forwarding service for forwarding host data among peer data storage devices 120 according to a tier configuration. For example, storage device 120.1 may initiate a self-assessment of host data stored in its media devices in response to one or more data management commands from a storage controller (e.g. storage controller 110), a host (e.g. host 102), and/or one or more peer storage devices (e.g. storage devices 120) to assess and forward host data according to the method 500 illustrated by blocks 510-590 of FIG. 5.

At block 510, a tier configuration may be received by a storage device. For example, when a host, server, peer storage device, or other network system using the data storage system needs to initiate or reconfigure a tiered storage array, a tier configuration may need to be available for use in identifying individual storage devices as members of defined storage tiers. In some embodiments, a tier configuration may be defined for the tiered storage array during an initiate setup or configuration of storage system 100 and/or one or more storage devices 120 and the tier configuration may be stored in a data structure within or accessible to storage devices 120. In some embodiments, a tier configuration may be provided to storage devices 120 initially, periodically, or on demand through a tier configuration command that includes complete or updated tier configuration information. In some embodiments, a change in tier configuration that changes the local performance tier may initiate the self-assessment (see block 530).

At block 520, data tiering criteria may be received. For example, when a host, server, peer storage device, or other network system using the data storage system needs to initiate or reconfigure a tiered storage array, data tiering criteria may be defined for use in matching host data to defined storage tiers. In some embodiments, data tiering criteria may be defined for the tiered storage array during an initiate setup or configuration of storage system 100 and/or one or more storage devices 120 and the tiering criteria may be stored in a data structure within or accessible to storage devices 120. In some embodiments, data tiering criteria may be provided to storage devices 120 initially, periodically, or on demand through data tiering criteria command that includes complete or updated data tiering criteria. In some embodiments, a change in data tiering criteria may initiate the self-assessment (see block 530).

At block 530, a self-assessment of one or more host data units may be initiated by the storage device. For example, the storage device may use periods of low I/O traffic to initiate scans for tiering changes across host data stored in its storage media. In some embodiments, a variety of other triggers, including assessment schedules (based on storage device cycles and/or data age), tiering change events, and/or receiving explicit commands to assess host data (on a device, data unit, or other allocation of data), may initiate the assessment.

At block 540, a local data unit (stored in the storage media devices of the storage device) is selected for assessment. For example, a data block, data object, or larger data unit with common parameters relevant to the data tiering criteria may be identified in a tiering validation command or selected based on the trigger that initiated the assessment (in block 530). In some embodiments, an assessment queuing algorithm may identify a series of data units for assessment and arrange them in a logical queue for sequential assessment based on priority, read efficiency, or other considerations. For example, all written data blocks may be maintained in a tiering assessment queue and processed round robin when compute resources in the storage device are available to do so.

At block 550, the host data tier for the data unit(s) selected in block 540 may be determined. For example, the storage device may use data tiering criteria and one or more parameters of the host data and/or related metadata to determine the host data tier. In some embodiments, a prior host data tier may be stored in the metadata or otherwise encoded with the data unit and the prior host data tier may be validated and/or updated.

At block 560, the host data tier is compared to the local performance tier to determine whether they match or are otherwise compatible. For example, the matching process may be similar to the operations of block 450 in FIG. 4. If there is a match, operation may return to block 540 to select another local data unit. If the host data tier is different from the local performance tier, a tiering change may have been identified and operation may proceed to block 570.

At block 570, a set of peer storage devices having a different performance tier than the local performance tier may be identified. For example, if the new host data tier was determined to be performance tier B and the processing storage device is performance tier A, the processing storage device may use the tier configuration to identify the set of peer storage devices with performance tier B.

At block 580, a destination storage device is selected from the set of peer storage devices identified at block 570. For example, the set of peer storage devices with performance tier B may include three peer storage devices. The processing storage device may implement an algorithm for selecting a destination storage device from among the peer storage devices.

At block 590, the processing storage device transfers the host data unit to the destination storage device. For example, the processing storage device may use the storage device identifier for the destination storage device to initiate a peer message or drive-to-drive data transfer to send the data unit or a related data command to the destination storage device.

Figure 6:
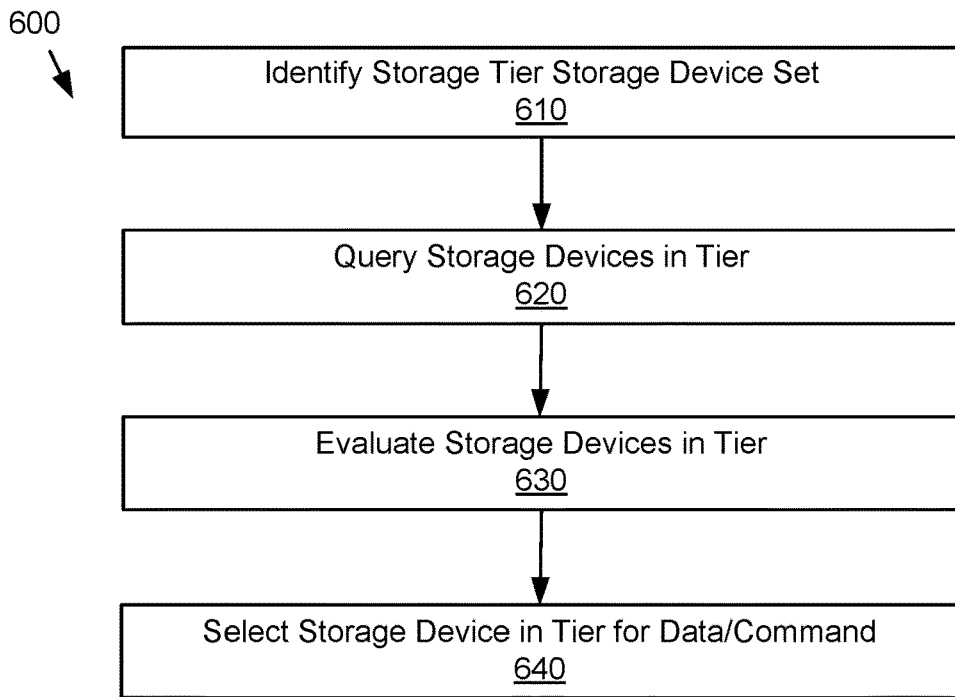
FIG. 6 illustrates an example of a method for selecting peer storage devices for routing host data in storage tier configuration.

As shown in FIG. 6, storage device 120.1 operating within data storage system 100 may be operated according to tiered storage services for transferring data to other data storage devices 120 based on tier configurations. For example, storage device 120.1 may receive or identify data units or commands for a storage tier including one or more peer storage devices (e.g. storage devices 120) and select a destination storage device according to the method 600 illustrated by blocks 610-640 of FIG. 6.

At block 610, a set of storage devices assigned to an identified storage tier may be identified by a processing storage device for host data command, data transfer, or other tiered data management operation. For example, a host data tier may be determined for a host data command, such as at block 440 in FIG. 4, or a local data unit, such as at block 550 in FIG. 5. The storage tier may correspond to a set of storage devices identified in the tier configuration and storage identifiers for the set of storage devices in the performance tier may be returned as a list or other data structure. In some embodiments, the storage tier may correspond to a performance tier in the tier configuration that does not match the local performance tier. In some embodiments, the identified storage tier may be the local performance tier.

At block 620, one or more peer storage devices may be queried for desired storage device information. For example, desired storage device information may include one or more performance tier values, available capacity, current status/availability, and/or other parameters for assigning data and/or commands among storage devices in the set identified at block 610. Queries for other types of information to support tier configuration or other array configuration and/or data management tasks may also be possible. In some embodiments, the query may take the form of a peer communication message directed through packetized network communication. In some embodiments, the query may take the form of a data read from a remotely accessible memory location containing the desired data. For example, each storage device may maintain a performance log and/or performance tier designation in its remotely addressable memory.

At block 630, the storage devices in the set may be evaluated based, at least in part, on information received in response to the query at block 620. For example, one or more criteria may be applied for determining which of the storage devices in the set is capable of receiving the data or command. In some embodiments, the performance tier for each storage device may be verified based on a performance tier value returned in the query response or the application of storage device tiering criteria to one or more other parameters returned in the query response. In some embodiments, the available capacity of each storage device may be evaluated to assure there is adequate capacity available to receive the data or command. In some embodiments, the current status of each storage device may be checked to evaluate whether the storage device is available to receive and process the data or command. If multiple storage devices in the storage device set are meet the evaluation criteria, then operation may proceed to block 640 for selection among the storage devices.

At block 640, a destination storage device is selected from the storage devices evaluated at block 630 and identified as eligible to receive the data or command. For example, if more than one storage device is eligible, a selection algorithm may be applied. Selection may be randomized, round robin, based on device age, capacity, or I/O performance, or based on a selection algorithm incorporating any number of parameters. If only one storage device is eligible, so selection algorithm may be necessary. If no storage devices are eligible, an error or status message may be returned and initiate retries or other remedial actions for completing the data transfer or command.

Figure 7:
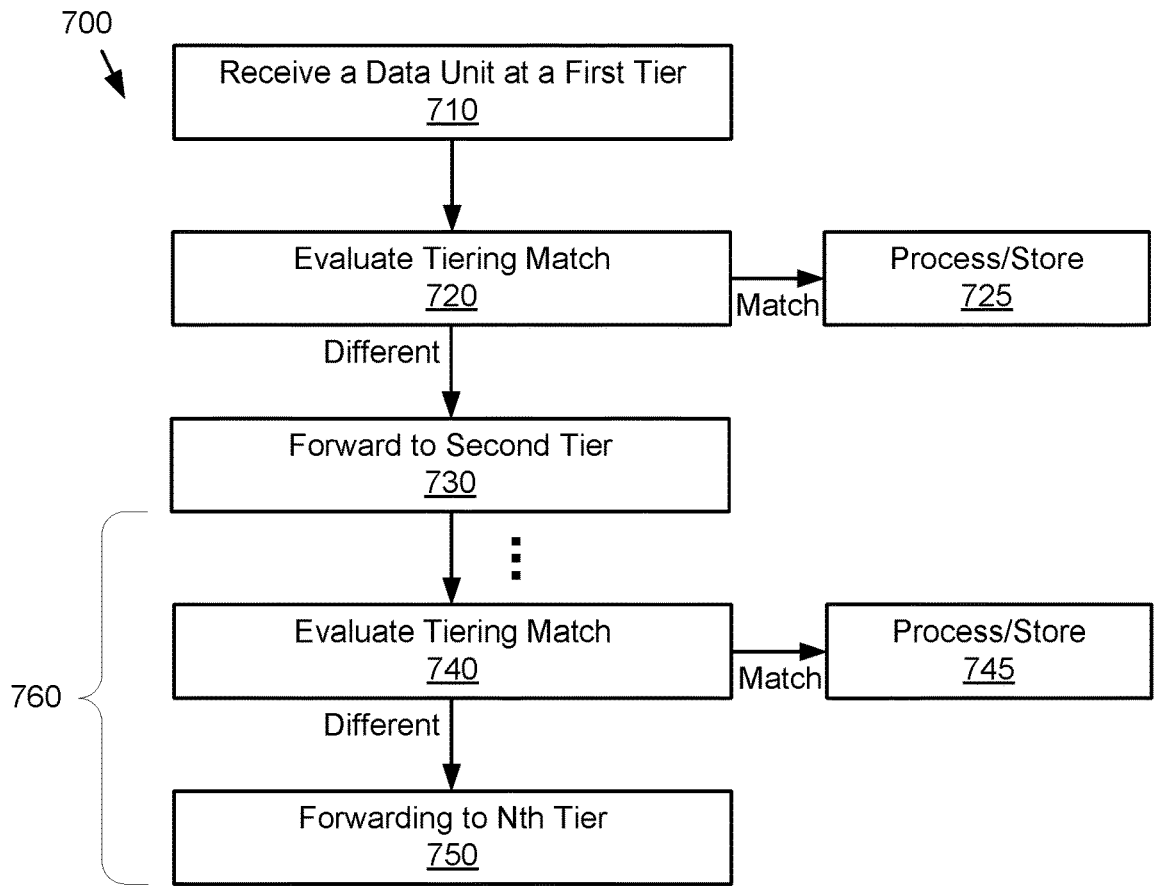
FIG. 7 illustrates an example of a method for iteratively routing host data using a storage tier configuration.

As shown in FIG. 7, a storage devices 120 operating within data storage system 100 may be operated according to a tiered data command routing service for routing host data commands to storage devices having the correct performance tier for that data command. For example, peer storage devices 120 may iteratively rout or forward host data commands according to the method 700 illustrated by blocks 710-760 of FIG. 7.

At block 710, a data unit is received at a first storage device assigned to a first performance tier. For example, a host or storage controller may initially address a host data command to the first performance tier, specifically the first storage device as a tier routing lead, randomly storage devices in the storage array, or by some other selection method. At block 720, the receiving storage device evaluates the host data tier of the received host data command for a match with its local performance tier. If there is a match, it may selectively process and/or store the host data command as the destination storage device at block 725.

If there is no match, the host data command may be forwarded by the first storage device to a second storage device assigned to a second performance tier at block 730. The second storage device may evaluate the tiering match at block 740 and process and/or store the host data command at block 745 if there is a match. Otherwise, it may forward the host data command to another storage device in another storage tier at block 750.

This process 760 may be repeated any number of times depending on the number of storage tiers in the tiered storage array. Each time, the processing storage device may evaluate the tiering match of the host data tier to the local performance tier and either process and/or store the host data command or forward it to a storage device in another performance tier.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device, comprising:
    a processor;
    a memory;
    at least one storage medium;
    an interface configured to communicate with a plurality of peer storage devices;
    a tier configuration stored in the memory and identifying:
        a local performance tier for data stored in the at least one storage medium; and
        a peer performance tier for each of the plurality of peer storage devices, wherein the local performance tier and each peer performance tier are selected from a plurality of performance tiers; and
    a data handler stored in the memory and executable by the processor to perform operations comprising:
        receiving a host data command;
        determining a host data tier for the host data command; and
        selectively forwarding the host data command to a destination peer storage device selected from the plurality of peer storage devices in response to the host data tier being different than the local performance tier, wherein the peer performance tier for the destination peer storage device matches the host data tier.

2. The storage device of claim 1, wherein:
    the plurality of performance tiers includes:
        a first performance tier; and
        a second performance tier; and
    the tier configuration identifies:
        a first set of the plurality of peer storage devices assigned to the first performance tier, the first set of the plurality of peer storage devices having matching peer performance tiers;
        a second set of the plurality of peer storage devices assigned to the second performance tier, the second set of the plurality of peer storage devices having matching peer performance tiers; and
        the local performance tier matching the peer performance tiers of the plurality of peer storage devices assigned to the first performance tier.

3. The storage device of claim 2, wherein the data handler performs further operations comprising:
    receiving the host data command from a storage controller based on being identified as a receiving storage device in the first performance tier; and
    selectively forwarding the host data command to a next storage device in the second performance tier in response to the host data tier matching the peer performance tier of the second performance tier.

4. The storage device of claim 1, wherein the data handler performs further operations comprising:
    querying at least one peer storage device for storage device status information using a storage device identifier;
    evaluating storage device status information for the at least one queried peer storage device; and
    selecting the destination peer storage device in response to evaluating storage device status information.

5. The storage device of claim 1, further comprising:
    a host data module stored in the memory and executable by the processor to perform operations comprising:
        processing the host data command for data storage on the at least one storage medium, wherein the data handler is configured to selectively forward the host data command to the host data module in response to the host data tier matching the local performance tier.

6. The storage device of claim 1, wherein:
more than one matching peer storage device has the peer performance tier that matches the host data tier; and
the data handler selects the destination peer storage device using storage device status information for each of the more than one matching peer storage device.

7. The storage device of claim 1, wherein:
more than one matching peer storage device has the peer performance tier that matches the host data tier; and
the data handler is configured to select the destination peer storage device using a selection algorithm for distributing a plurality of host data commands among each of the more than one matching peer storage device.

8. The storage device of claim 1, further comprising:
a tiered data manager stored in the memory and executable by the processor to perform operations comprising:
evaluating data tiering information of host data stored in the at least one storage medium to identify stored data units with host data tiers that do not match the local performance tier; and
selectively forwarding stored data units to a transfer peer storage device selected from the plurality of peer storage devices in response to host data tiers being different than the local performance tier, wherein the peer performance tier for the transfer peer storage device matches host data tiers for the forwarded stored data units.

9. The storage device of claim 8, wherein selectively forwarding stored data units includes transfer of a data history for each of the forwarded stored data units to the transfer peer storage device.

10. The storage device of claim 8, wherein evaluating tiering information is in response to a change in the local performance tier from a first performance tier of the plurality of performance tiers to a second performance tier of the plurality of performance tiers.

11. The storage device of claim 8, further comprising:
at least one data tiering criterion stored in the memory, wherein:
the data tiering information includes a data history for stored data units;
the at least one data tiering criterion is based on the data history for stored data units;
evaluating tiering information is in response to a change in the data history for stored data units that results in an assigned host data tier for at least one stored data unit changing from a first performance tier of the plurality of performance tiers to a second performance tier of the plurality of performance tiers; and
the assigned host data tier matches the local performance tier before the change and is different than the local performance tier after the change.

12. A computer-implemented method, comprising:
storing, in a first storage device, storage device identifiers for a plurality of peer storage devices;
storing a tier configuration identifying:
a local performance tier for data stored in the first storage device; and
a peer performance tier for each of the plurality of peer storage devices, wherein the local performance tier and each peer performance tier are selected from a plurality of performance tiers;
receiving a host data command;
determining a host data tier for the host data command; and
selectively forwarding the host data command from the first storage device to a destination peer storage device selected from the plurality of peer storage devices in response to the host data tier being different than the local performance tier, wherein the peer performance tier for the destination peer storage device matches the host data tier.

13. The computer-implemented method of claim 12, wherein:
the plurality of performance tiers includes:
a first performance tier; and
a second performance tier; and
the tier configuration identifies:
a first set of the plurality of peer storage devices assigned to the first performance tier, wherein each of the plurality of peer storage devices in the first set and has a first matching peer performance tier with each other peer storage device in the first set;
a second set of the plurality of peer storage devices assigned to the second performance tier, wherein each of the plurality of peer storage devices in the second set has a second matching peer performance tier with each other peer storage device in the second set; and
the first storage device assigned to the first performance tier and having the first matching peer performance tier; and
the host data command is received from a storage controller to the first storage device before being selectively forwarded to the second performance tier in response to the host data tier matching the peer performance tier of the second performance tier.

14. The computer-implemented method of claim 12, further comprising:
selectively storing data from the host data command in the first storage device in response to the host data tier matching the local performance tier.

15. The computer-implemented method of claim 12, wherein selectively forwarding the host data command from the first storage device to the destination peer storage device comprises:
querying at least one peer storage device for storage device status information using a storage device identifier;
evaluating storage device status information for the at least one queried peer storage device; and
selecting the destination peer storage device in response to evaluating storage device status information.

16. The computer-implemented method of claim 12, further comprising:
evaluating data tiering information of host data stored in the first storage device to identify stored data units with host data tiers that do not match the local performance tier; and
selectively forwarding stored data units to a transfer peer storage device selected from the plurality of peer storage devices in response to host data tiers being different than the local performance tier, wherein the peer performance tier for the transfer peer storage device matches host data tiers for the forwarded stored data units.

17. A storage system, comprising:
a plurality of peer storage devices, wherein each of the plurality of peer storage devices comprises:
   at least one storage medium;
   means for storing a local performance tier for the at least one storage medium, wherein the local performance tier is selected from a plurality of performance tiers;
   means for storing storage device identifiers for the plurality of peer storage devices;
   means for evaluating data tiering information of host data stored in the at least one storage medium to identify stored data units with host data tiers that do not match the local performance tier; and
   means for selectively forwarding stored data units to a transfer peer storage device selected from the plurality of peer storage devices in response to host data tiers being different than the local performance tier, wherein a peer performance tier selected from the plurality of performance tiers for the transfer peer storage device matches host data tiers for the forwarded stored data units.

18. The storage system of claim 17, wherein each of the plurality of peer storage devices further comprises:
   means for initiating the means for evaluating data tiering information in response to a tiering change, the tiering change selected from:
      a performance change in the local performance tier from a first performance tier of the plurality of performance tiers to a second performance tier of the plurality of performance tiers;
      a data tier change in the host data tiers of the stored data units; or
      a data criteria change in at least one data tiering criterion used to determine the host data tiers.

19. The storage system of claim 17, wherein each of the plurality of peer storage devices further comprises:
   means for storing a tier configuration identifying a peer performance tier selected from the plurality of performance tiers for each of the plurality of peer storage devices;
   means for receiving a host data command;
   means for determining a host data tier for the host data command; and
   means for selectively forwarding the host data command to a destination peer storage device selected from the plurality of peer storage devices in response to the host data tier being different than the local performance tier, wherein the peer performance tier for the destination peer storage device matches the host data tier.

20. The storage system of claim 17, wherein each of the plurality of peer storage devices further comprises:
   means for receiving storage device status information from the plurality of peer storage devices;
   means for evaluating storage device status information for at least one peer storage device from the plurality of peer storage devices; and
   means for selecting a destination peer storage device in response to evaluating storage device status information.

* * * * *